United States Patent Office 2,982,770
Patented May 2, 1961

2,982,770
ALKYL DESERPIDATES

Paul Reuben Ulshafer, Summit, N.J., assignor to Ciba Pharmaceutical Products, Inc., Summit, N.J., a corporation of New Jersey No Drawing. Filed Oct. 28, 1955, Ser. No. 543,574

6 Claims. (Cl. 260—287)

This application is a continuation-in-part of my copending applications Serial Nos. 468,162 and 471,519, filed November 10, 1954, and November 26, 1954, respectively, both now abandoned.

The present invention relates to the degradation of a new alkaloid called deserpidine to form a new acid and the preparation of its esters and salts.

Deserpidine, an alkaloid having sedative and hypotensive action, can be obtained according to my copending applications, Serial Nos. 454,597 and 468,161, filed September 7, 1954, and November 10, 1954, respectively, both now abandoned. It can be used as a medicament for producing sedation and for the treatment of hypertension. I have now made the unexpected observation that when deserpidine is treated with certain agents described below, a new carboxylic acid is obtained. I have given it the name deserpidic acid. My investigations have shown that in addition to the free carboxyl group, deserpidic acid has a free hydroxyl group and can therefore be represented by the formula:

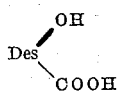

wherein Des stands for the divalent organic radical containing carbon, hydrogen, oxygen and nitrogen and being bound to the free hydroxyl and carboxyl groups in the deserpidic acid. My investigations have further disclosed the fact that by conversion of the carboxyl group into an esterified carboxyl group, e.g. carbomethoxy group, and the hydroxyl group into an esterified hydroxy group, for example a 3,4-dimethoxy-benzoyloxy group or a 3,4,5-trimethoxy-benzoyloxy group, or other acyloxy groups indicated below, deserpidic acid can be converted into valuable esters.

Deserpidic acid crystallizes from methanol and melts at 270–273° (dec.). According to analysis, deserpidic acid has the empirical formula: $C_{21}H_{26}O_4N_2$. Its infra-red spectrum in "Nujol" (mineral oil) shows the following absorption bands: strong bands at 3379–3201, 1580, 1454, 1377, 1318, 1199, 1137, 1082, 740 cm.$^{-1}$; medium bands at 1709, 1241, 1227, 1190, 1025, 1009, 977 cm.$^{-1}$; weak bands at 925, 900, 877, 849 cm.$^{-1}$; shoulders at 1301, 1156, 837, 765, 720 cm.$^{-1}$.

In addition to the preparation of deserpidic acid of the formula:

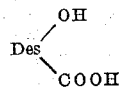

the invention embraces the preparation of the esters of such acid in which at least the carboxyl group is esterified, and the salts thereof. Besides deserpidic acid, the invention particularly embraces the preparation of those esters in which the carboxyl group is esterified with an alkanol, preferably a lower alkanol, such as ethanol, propanol, butanol, and preferably methanol, and in which the hydroxyl group is free or esterified with an acid such as organic sulfonic or carboxylic acids, e.g. arylsulfonic acids. The preferred acids are carboxylic acids, especially those of the aromatic, heterocyclic or araliphatic series, and primarily those of these series which contain an unsaturated mono- or bicycle. Especially valuable are aromatic or araliphatic carboxylic acids containing a phenyl radical which is advantageously substituted, preferably at least in 4-position, by etherified hydroxyl groups, especially lower alkoxy groups such as methoxy or a methylenedioxy group; such acids are, for example, benzoic acid, phenyl acetic acid or cinnamic acid, but preferably 3,4,5-trimethoxy-benzoic acid, 3,4-dimethoxy-benzoic acid, 4-methoxy-benzoic acid, 3,4-methylenedioxy-benzoic acid, O-carbalkoxy-syringic acids, such as O-carbethoxy-syringic acid, or 3,4,5-trimethoxy-cinnamic acid; further acids are at most bicyclic heterocyclic acids containing only one hetero-atom, e.g. furane carboxylic acids such as furane-2-carboxylic acid, thiophene-carboxylic acids, such as thiophene-2-carboxylic acid, pyridine-carboxylic acids such as pyridine-3-carboxylic acid, or quinoline carboxylic acids; or lower alkane carboxylic acids, preferably acetic acid. Deserpidic acid and its esters, in which at least the carboxylic group is esterified, and the salts thereof are new. The compounds of this invention, which have a free hydroxyl group, can be used as intermediate products in the manufacture of medicaments; thus they can be converted into their esters with acids. These esters, especially those of the aromatic, araliphatic and heterocyclic series and primarily those with the acids containing an unsaturated monocycle and especially a phenyl radical as indicated above, have valuable pharmaceutical properties. They exhibit sedative action. Esters of this formula possess also hypotensive activity. These new esters can therefore be used as medicaments to bring about sedation and for the treatment of hypertension. They are also useful as intermediates for preparing other valuable substances with related structure.

Especially valuable with respect to their pharmacological activity are methyl O-(3,4,5-trimethoxy-benzoyl)-deserpidate, methyl O - (3,4-dimethoxy-benzoyl)-deserpidate, methyl O-(4-methoxy-benzoyl)-deserpidate, methyl O-(3,4-methylenedioxy-benzoyl) - deserpidate, methyl O-furoyl-(2) - deserpidate, methyl O-nicotinoyl-deserpidate, methyl O-(3,4,5-trimethoxy-cinnamoyl)-deserpidate, ethyl O-(3,4,5-trimethoxy-benzoyl)-deserpidate, methyl O-(O'-carbethoxy-syringoyl)-deserpidate, and methyl O-acetyl-deserpidate.

The first stage of the process of this invention for the preparation of said compounds comprises subjecting deserpidine to the action of an alkaline saponifying medium.

Depending on the procedure which is followed, it is possible to split both ester groups or to saponify deserpidine partially, splitting only the esterified hydroxyl group. Thus one may work with different alkaline saponifying agents or with the same but under different conditions e.g. in the presence or absence of water, at a lower or higher temperature or for a longer or shorter period of time. For example, when deserpidine is heated for a comparatively long time with the solution of an alkali hydroxide, such as potassium hydroxide, in an alcohol, such as methanol, both ester groups are hydrolyzed. When the treatment is performed with the same agent under milder conditions, e.g. for a short time only, only the esterified hydroxyl group is split.

For partial saponification, however, there is used as alkaline saponifying agent especially one capable of converting an esterified hydroxyl group into a free hydroxyl group with the formation of an ester, that is to say, by alcoholysis, the carbomethoxy group being re-esterified, depending on the conditions employed. It is thus of advantage to work in an anhydrous alcohol in the presence of an alcoholate, such as an alkali metal or aluminum alcoholate or some other alcoholyzing agent, such as sodium carbonate or piperidine. In absolute methanol in the presence of e.g. an alkali methylate, such as sodium methylate or aluminum tertiary butylate, piperidine, or sodium carbonate, there is formed the deserpidic acid methyl ester. When the alcoholysis is carried out in other absolute alcohols, such as ethanol or butanol in the presence, for example, of the corresponding alcoholates, such as sodium ethylate or sodium butylate or other alcoholyzing agents, there are obtained by re-esterification the corresponding deserpidic acid esters, such as deserpidic acid ethyl ester or butyl ester. The products of this process are isolated by known methods. For conversion into deserpidic acid, the esters can be further treated in an alkaline medium, e.g. with an alkaline solution of an alkali hydroxide such as a methanolic solution of potassium hydroxide.

Deserpidic acid esters with a free hydroxyl group can also be obtained by treating deserpidic acid with an esterifying agent capable of converting a carboxyl group into an esterified carboxyl group. To this end the deserpidic acid can be converted into an ester thereof either directly or by way of a functional derivative thereof. Advantageously deserpidic acid is reacted with a diazoalkane or it is esterified with an alcohol, especially an alkanol, in the presence of a strong acid, such as a hydrohalic acid.

To prepare an ester of the deserpidic acid of which both functional groups are esterified, a deserpidic acid ester with a free hydroxyl group is treated with an esterifying agent capable of converting a hydroxyl group into an esterified hydroxyl group. One procedure is to react an ester with a free hydroxyl group with the desired acid advantageously in the form of a reactive functional derivative thereof, especially a halide, such as, for example, the chloride, or an anhydride. The reaction is advantageously conducted in the presence of a diluent and/or a condensing agent. When an acid halide is used it is advantageous to work in an anhydrous solvent in the presence of an acid-binding agent, such as an alkali carbonate or alkaline earth carbonate or a strong organic base such as a tertiary amine. There may be used, e.g. an acid halide in pyridine as solvent.

Depending on the method of working, deserpidic acid and its esters are obtained in the free form or as salts. Since deserpidic acid, in addition to the carboxyl group, contains a basic group, it can form salts with bases or acids. It is possible to prepare from deserpidic acid, e.g. by reaction with a metal hydroxide, a metal salt, e.g. an alkali metal salt such as sodium or potassium salt. On the other hand, deserpidic acid and its esters can be converted into their salts with acids, for example, by treating them with inorganic or organic acids, such as hydrohalic acids, sulfuric acid, phosphoric acid, nitric acid, hydroxyethane sulfonic acid, toluene sulfonic acid, acetic acid, tartaric acid, or citric acid. From the salts, deserpidic acid and its esters can be obtained in the free form. Free deserpidic acid is obtained, for example, from deserpidic acid hydrochloride by reaction with silver carbonate. Where the esters of deserpidic acid with an esterified hydroxy group are intended for therapeutic use in the form of their salts, these salts are understood to be non-toxic and therapeutically useful.

In the afore-mentioned reactions, the starting materials can be used in free form or in the form of the salts mentioned. Thus it is possible e.g. to react deserpidic acid in the form of its hydrochloride with a diazoalkane. Instead of deserpidine, material containing deserpidine can be used as starting material, such as an extract from plant material of the Rauwolfia species, e.g. of *Rauwolfia canescens*, or a crude alkaloid mixture containing deserpidine and reserpine. The deserpidic acid and its esters with a free hydroxyl group used in the preparation of the therapeutically useful esters may also be obtained from other sources than deserpidine or deserpidic acid respectively.

The new compounds of the invention can be prepared by the processes disclosed hereinbefore in substantially pure form.

The new pharmacologically active esters of the invention can be made up for therapeutic administration into pharmaceutical compositions. These compositions may be in any suitable solid or liquid dosage form, especially in a form suitable for oral or parenteral administration, e.g. tablets, powder, capsules, pills, solutions, emulsions or suspensions, e.g. in the form of ampouled injectable solutions. As pharmaceutical carriers there may be employed materials or mixtures of such which do not react with deserpidine and are therapeutically useful. Substances or mixtures thereof, such as water, gelatine, lactose, starch, magnesium stearate, talc, vegetable oils, benzyl alcohol, ascorbic acid, gums, glycols such as propylene glycol or polyalkylene glycol, petroleum jelly, cholesterol, tragacanth, alcohol or others may be employed. The new compounds are administrable in amounts varying from about 0.1 mg. to about 100 mg., preferably from about 0.2 mg. to about 20 mg. per dosage unit.

In preparing the novel compositions the esters or its salts are admixed with the pharmaceutical carrier and formulated in the desired dosage unit form according to pharmaceutical practice. The compositions may be sterilized and may contain auxiliary substances such as preservative, stabilizing, wetting or emulsifying substances, salts for the control of the osmotic pressure or buffer substances or other therapeutically active substances, such as 1-hydrazino-phthalazine hydrochloride or pure reserpine.

The following examples will serve to illustrate the invention, the relationship of parts by weight to parts by volume being the same as the gram to the milliliter. Temperatures are given in degrees centigrade.

*Example 1*

To 1 part by weight of deserpidine in 20 parts by volume of methanol is added a solution of 2 parts by weight of potassium hydroxide in 10 parts by volume of water. This mixture is refluxed for 2 hours under an atmosphere of nitrogen. At the end of this period all the deserpidine is dissolved and the resulting solution is filtered through glass wool. After cooling, glacial acetic acid (3 parts by volume) is added to give the solution a pH of about 6. The solution is then evaporated in vacuo to a white, solid froth, which is triturated with 25 parts by volume of ether and filtered. The ether insoluble portion is similarly treated with two portions each of 25 parts by volume of ether. The white, ether-insoluble solid is triturated once with 100 parts by volume of acetone and then with 5 portions each of 50 parts by volume of acetone. After each trituration the mixture is filtered and the filtrates evaporated to dryness in vacuo. The white, solid froths thus resulting from the first four triturations are combined and crystallized from methanol, yielding white prisms, melting at 267–269° (dec.). The product is recrystallized by dissolving in a large volume of methanol and methylene chloride, filtering and concentrating until a small volume of methanol remains. After two such recrystallizations deserpidic acid is obtained in the form of white prisms melting at 270–273° (dec.). According to analysis deserpidic acid has the empirical formula $C_{21}H_{26}O_4N_2$. Free deserpidic acid can be converted into its salts; thus, by treating with aqueous methanolic potassium hydroxide solution, filtering and adding ether to the obtained solution, there is obtained the potassium salt as a white powder. By treatment with acids such as nitric acid or hydrochloric acid, the corresponding acid addition salts are obtained. The alkaloid deserpidine used as starting material can be obtained according to the process described in my copending application Serial No. 454,597, filed September 7, 1954, for example as follows:

500 parts by weight of dried, finely ground roots of *Rauwolfia canescens* are extracted batchwise with methanol at its boiling point, using the following volumes and times, and filtering each extract while hot: 2,000 parts by volume, 1 hour; 1,000 parts by volume, 45 minutes; 1,000 parts by volume, 30 minutes; 1,000 parts by volume, 30 minutes. The extracts are combined and evaporated in vacuo to 75 parts by volume of thick syrupy solution. After the addition of 75 parts by volume of methanol and 150 parts by volume of acetic acid of 15 percent strength with adequate mixing, the solution is of acetic acid of 15 percent strength with adequate mixing, the solution is extracted with 2 portions each of 100 parts by volume of hexane. The combined hexane extracts are extracted with 15 parts by volume of acetic acid of 15 percent strength. The latter extract is added to the above acetic acid phase which is then extracted with 3 portions each of 75 parts by volume and 1 portion of 50 parts by volume of ethylene chloride. The first 3 extracts are combined and washed with 60 parts by volume of 2 N sodium carbonate solution and then with 60 parts by volume of distilled water. These washing solutions are saved and used for the washing of the 4th and final ethylene chloride extract. The combined ethylene chloride extracts are dried over sodium sulfate, filtered and evaporated in vacuo to a constant weight of a tan, frothy solid. 1 part by weight of this residue is dissolved in 1.5 parts by volume of warm methanol and the solution cooled to 5° C. for 18 hours, whereby crystallization of reserpine sets in. After filtering from the crystallized reserpine and washing with cool methanol, the filtrate is freed of solvent in vacuo. 2 parts by weight of the resulting red-brown solid froth are triturated with 2 portions each of 25 parts by volume of benzene and filtered each time. The benzene insoluble material is saved for further treatment. The benzene soluble fraction is poured onto a column of 40 parts by weight of activated alumina (Woelm, activity grade I), which is then eluted first with 3 portions each of 50 parts by volume of benzene and then with 6 portions each of 50 parts by volume of benzene-acetone (9:1), the first of which benzene-acetone portions had been used for extraction of the above-mentioned benzene insoluble material. The second of the 6 benzene-acetone elution fractions on removal of the solvents gives a light tan solid froth which on crystallization from methanol gives colorless prismatic needles of slightly impure deserpidine. Rechromatographing of 1 part by weight of this substance on 20 parts by weight of activated alumina (Woelm, activity grade I) using benzene and benzene containing 0.1 percent methanol as eluting agents followed by crystallization from methanol gives colorless prismatic needles of pure deserpidine, melting at 228–232° C.

*Example 2*

To 0.5 part by weight of deserpidine is added a solution of 0.05 part by weight of sodium in 25 parts by volume of methanol. The mixture is refluxed under nitrogen for one hour during which the deserpidine all dissolves. After cooling, the solution is concentrated in vacuo to a volume of about 10 parts by volume. 30 parts by volume of water are added and then concentrated hydrochloric acid in a dropwise manner until the solution is strongly acidic. It is then extracted with 15 parts by volume of ether and re-extracted with 3 portions each of 10 parts by volume of ether. The aqueous phase is then made basic with concentrated aqueous ammonia and extracted with 15 parts by volume of methylene chloride and re-extracted with 3 portions each of 10 parts by volume of methylene chloride. The combined methylene chloride extracts are dried over anhydrous potassium carbonate and concentrated in vacuo to give methyl deserpidate as a pale, yellow solid froth which analyzes for the empirical formula: $C_{22}H_{28}O_4N_2$. In the same manner, by employing dry ethanol or butanol instead of methanol, the corresponding alkyl deserpidates are obtained.

Methyl deserpidate shows in the U.V. absorption spectrum, taken in ethanol solution, the following bands: maxima: $\lambda=225$ m$\mu$ ($\epsilon=33000$), 281–282 m$\mu$ ($\epsilon=7510$), 289 m$\mu$ ($\epsilon=6400$); minima: $\lambda=248$ m$\mu$ ($\epsilon=2000$), 288 m$\mu$ ($\epsilon=6360$).

A Nujol mull showed the following bands in the infrared, given in reciprocal centimeters: strong bands at 3362, 2942, 2851, 1724, 1466, 1140, 1102, 742; medium bands at 1378, 1356, 1333, 1317, 1303, 1287, 1275, 1258, 1243, 1225, 1203, 1166, 1157, 1053, 1040, 1013, 993, 986, 680; medium-weak bands at 923, 880, 651; weak bands at 959, 900, 850, 837, 805; shoulders at 3022, 1090.

0.33 part by weight of the above-described methyl deserpidate is chromatographed on 5 parts by weight of alumina (Alcoa, acid washed; activity No. 3). A fraction eluted with 25 parts by volume of benzene containing 1 percent methanol gives, after removal of solvent, a non-crystalline residue. 0.03 part by weight of this is dissolved in 1.2 parts by volume of 10 percent acetic acid and a few drops of saturated sodium nitrate solution is added. After standing at room temperature several days, the crystalline material is filtered. This is re-crystallized from methanol to give prisms of the nitric acid salt of methyl deserpidate, which melts at 271, 276° and analyzes for $C_{22}H_{28}O_4N_2 \cdot HNO_3$. Other salts, which can be obtained from methyl deserpidate are, for example, those with hydrochloric acid, sulfuric acid, phosphoric acid, acetic acid, tartaric acid, citric acid, hydroxy ethane sulfonic acid, toluene sulfonic acid and the like.

Methyl deserpidate can also be obtained from deserpidic acid by reaction with diazomethane in methanolic solution. In the same manner, using diazoethane, ethyl deserpidate can be obtained; using other diazoalkanes, such as diazopropane or -butane, the corresponding esters are obtained. Instead of employing diazoalkanes, the alcohols in the presence of an acid catalyst such as hydrochloric acid may be employed to esterify the deserpidic acid. The esterifying agent may be employed in equivalent amounts or in excess.

By boiling methyl deserpidate in a solution of sodium hydroxide in aqueous methanol under an atmosphere of nitrogen and working up as described in Example 1, there is obtained deserpidic acid melting at 270–273° (dec.).

*Example 3*

0.3 part by weight of methyl deserpidate is dissolved in 2 parts of volume of dry distilled pyridine and added slowly to a cooled mixture of 0.33 part by weight of 3,4,5-trimethoxy-cinnamoyl chloride in 2 parts by volume of dry distilled pyridine. 1 part by volume of dry pyridine is used as a rinse. After standing at 5° for 4 days, the reaction mixture is poured into 20 parts by volume of water and ice. 10 parts by volume of 10 pecent aqueous ammounia are added, the mixture is triturated for about 5 minutes and then extracted with three portions each of 15 parts by volume methylene chloride. The combined extracts are washed with 5 parts by volume of cold sodium chloride solution, dried over anhydrous potassium carbonate, and concentrated in vacuo to a solid residue. 0.41 part by weight of this is dissolved in 10 parts by volume of benzene and 2 parts by volume of hexane and chromatographed on 8 parts by weight activated alumina (Woelm; activity No. 1). From the fractions eluted with benzene (400 parts by volume), followed by removal of the solvent and crystallization from methanol - hexane, methyl O - (3,4,5-trimethoxy-cinnamoyl) - deserpidate is obtained in the form of small white plates which sinter to a glass at 133–143°, recrystallize at 182° and melt at 216–217°. It possesses sedative and hypotensive activity. It analyzes for the empirical formula $C_{34}H_{40}O_8N_2$. In the U.V. spectrum taken in ethanolic solution it possesses the following maxima: $\lambda=226$–$227$ m$\mu$ ($\epsilon=53900$), 291 m$\mu$ ($\epsilon=21600$) and a minimum at $\lambda=254$–$255$ m$\mu$ ($\epsilon=6700$). Its infrared spectrum (in "Nujol") shows the following absorption bands: strong bands at 2939–2839, 1729, 1704, 1458, 1313, 1276, 1252, 1182, 1153, 1129 cm.$^{-1}$; medium bands at 3402, 1636, 1584, 1507, 1420, 1378, 1044, 995, 831, 728 cm.$^{-1}$; weak bands at 916, 878 cm.$^{-1}$; shoulders at 3360, 3043, 1330, 1301, 1211, 1102, 1057, 1010, 738 cm.$^{-1}$. The 3,4,5-trimethoxy-cinnamoyl chloride used as starting material can be obtained as follows.

4 parts by weight of 3,4,5-trimethoxy-cinnamic acid are refluxed for 35 minutes in an anhydrous system, with 6 parts by volume redistilled thionyl chloride. The excess thionyl chloride is removed under vacuum and by distilling from the residue two portions of dry benzene. The crystalline residue is twice crystallized from hexane-ether to give 3,4,5-trimethoxy-cinnamoyl chloride as bright yellow prisms, melting at 95–96°.

Example 4

0.5 part by weight of methyl deserpidate, dried by distilling toluene under vacuum from it twice, is dissolved in 5 parts by volume of dry, freshly distilled pyridine. 0.5 part by volume of acetic anhydride is added with cooling. The reaction mixture is allowed to stand at 5° for 5 days, after which it is poured into 50 parts by volume of water and ice. 12 parts by volume of 5 percent aqueous ammonia are added and the mixture triturated for about 10 minutes. It is then extracted with 50 parts by volume of methylene chloride and re-extracted with 15 parts by volume and then with 10 parts by volume of the same solvent. The combined extracts are washed with 2 portions each of 10 parts by volume of a sodium chloride solution, dried over anhydrous potassium carbonate and evaporated in vacuo to give the crude O-acetyl-methyl deserpidate. After crystallization from methanol, it melts at 275–278° and analyzes for the empirical formula: $C_{24}H_{30}O_5N_2$. Methyl O-acetyl-deserpidate possesses sedative activity. Its optical rotation is $[\alpha]_D^{26}=-132°\pm1°$ (chloroform). Its infrared absorption spectrum taken in "Nujol" shows the following bands: strong bands at 2948–2853, 1737, 1709, 1263, 1252, 1092, 732 cm.$^{-1}$; medium bands at 3386, 1462, 1444, 1379, 1358, 1333, 1314, 1301, 1287, 1214, 1184, 1157, 1116, 1042, 1010, 975, 880, 645 cm.$^{-1}$; weak bands at 954, 928, 916, 908, 850, 829, 804, cm.$^{-1}$; shoulders at 3043, 1490, 1222, 1195, 1145, 1127, 1105, 1056, 1034 cm.$^{-1}$. Its U.V. absorption spectrum in ethanolic solution shows the following maxima $\lambda=226$ m$\mu$ ($\epsilon=32200$), 282–283 m$\mu$ ($\epsilon=7340$), 289–290 m$\mu$ ($\epsilon=6300$; and minima: $\lambda=247$–$248$ m$\mu$ ($\epsilon=2070$), 288 m$\mu$ ($\epsilon=6240$).

Example 5

To a solution of 0.46 part by weight of methyl deserpidate (dried by distilling toluene from it twice) in 5 parts by volume of freshly distilled pyridine is added dropwise and with cooling 0.46 part by weight of p-toluenesulfonyl chloride in 1 part by volume of dry benzene. 1 part by volume of pyridine is used to rinse the reagent into the reaction flask which is securely stoppered and allowed to stand at 5° for 5 days. The reddish solution is poured into approximately 50 parts by volume of ice and water. 12 parts by volume of 5 percent aqueous ammonia are added and the semi-solid precipitate is triturated for about 5 minutes. The mixture is then extracted with three portions of methylene chloride of 50 parts by volume, 15 parts by volume and 10 parts by volume. The combined methylene chloride extracts are washed three times with small portions of a cold sodium chloride solution, dried over anhydrous potassium carbonate and evaporated in vacuo to a semi-crystalline residue. 0.63 part by weight of this is dissolved in methylene chloride, filtered through approximately 0.02 part by weight of activated charcoal on a diatomaceous earth filter cell, evaporated and crystallized from 4 parts by volume of benzene. Additional material is obtained from the benzene mother liquors. Recrystallization from methanol gives methyl O - (p - toluenesulfonyl) - deserpidate, melting at 226–228°. It analyzes for the empirical formula: $C_{29}H_{34}O_6N_2S$ and has the optical rotation $[\alpha]_D^{26}=-85°\pm2°$ (chloroform). Its U.V. absorption spectrum taken in ethanolic solution shows the following maxima: $\lambda=225$ m$\mu$ ($\epsilon=22250$), 282 m$\mu$ ($\epsilon=7860$) and a minimum at $\lambda=247$ m$\mu$ ($\epsilon=2300$). Its infrared absorption spectrum taken in "Nujol" shows the following bands: strong bands 2956–2837, 1739, 1464, 1368, 1347, 1334, 1181, 1157, 1116, 1094, 940, 920, 906, 844, 815, 740 cm.$^{-1}$; medium bands at 3429, 1600, 1378, 1313, 1303, 1287, 1275, 1266, 1253, 1211, 1142, 1129, 1055, 1041, 1023, 1010, 982, 877, 798, 723, 666 cm.$^{-1}$; weak bands at 704, 647 cm.$^{-1}$; shoulders at 3043, 1582, 1500, 1392, 1325, 1227, 1193, 1101, 830, 807 cm.$^{-1}$.

Example 6

0.5 part by weight of methyl deserpidate, dried by distilling toluene under vacuum from it twice, is dissolved in 5 parts by volume of dry distilled pyridine 0.5 part by volume of 2-furoyl chloride (freshly distilled) is added with cooling. The resulting precipitate is re-dissolved by the addition of 2 parts by volume of dry benzene. After standing at 50° C. for 5 days the reaction mixture is poured into 50 parts by volume of water and ice. 12 parts by volume of 5 percent aqueous ammonia are added and the mixture triturated for about 10 minutes. It is then extracted with 50 parts by volume methylene chloride and re-extracted with 15 parts by volume and then with 10 parts by volume of the same solvent. The combined extracts are washed with 2 portions each of 10 parts by volume sodium chloride solution, dried over anhydrous potassium carbonate and concentrated in vacuo. 0.720 part by weight of the residue is dissolved in 15 parts by volume of dry benzene and chromatographed on 14 parts by weight activated alumina (Woelm; activity No. 1). From the fractions eluted with 200 parts by volume of benzene and with 100 parts by volume of benzene containing 0.1 percent methanol, followed by removal of the solvents and crystallization from methanol, methyl O-furoyl-(2)-deserpidate is obtained in fine, white needles, melting at 244–247°. It has sedative and hypotensive activity. It analyzes for the empirical formula: $C_{27}H_{30}O_6N_2$ and shows the optical rotation $[\alpha]_D^{25}=-141°\pm0.5°$ (chloroform), its U.V. absorption spectrum taken in ethanolic solution shows the following maxima: $\lambda=226$ m$\mu$ ($\epsilon=37700$), $\lambda=255$ m$\mu$ ($\epsilon=18000$); a minimum at $\lambda=241$ m$\mu$ ($\epsilon=14800$) and a plateau at $\lambda=278$–$284$ m$\mu$. Its infrared spectrum taken in "Nujol" shows the following bands: strong bands at 2941–2816, 1710, 1305, 1187, 1123, 738 cm.$^{-1}$; medium bands at 1631, 1575, 1463, 1400, 1378, 1350, 1266, 1230, 1109, 1093, 1061, 1041, 1030, 1015, 979, 969, 933, 766, 755, 746 cm.$^{-1}$; weak bands at 3516, 3377, 3283, 917, 902, 885, 853, 822 cm.$^{-1}$; shoulders at 3042, 1736, 1441, 1327, 1282, 1223, 1213, 1155, 1145, 1181, 985, 721 cm.$^{-1}$.

Example 7

To a solution of 0.5 part by weight of methyl deserpidate in 4 parts by volume of dry distilled pyridine is added 0.5 part by weight of 3,4-dimethoxy-benzoyl chloride in 2 parts by volume of benzene, dropwise and with cooling and stirring. 1 part by volume of pyridine is used to rinse the reagent into the reaction flask which is stoppered and kept at 5° C. for 5 days. The reaction mixture is poured into 50 parts by volume of water containing ice. 2 parts by volume of concentrated aqueous ammonia in 10 parts by volume of water are added. After trituration for 5 minutes, the mixture is extracted with 3 portions of methylene chloride: 50 parts by volume, 15 parts by volume and 10 parts by volume. The combined methylene chloride extracts are washed twice with 10 parts by volume of saturated sodium chloride solution. After drying over anhydrous potassium carbonate, the solution is filtered and evaporated in vacuo to dryness. The tan solid froth is crystallized from 5 parts by volume of methanol to give crystals melting at 211–215°. This, on recrystallization from methanol after activated charcoal treatment in methanol-methylene chloride solution, gives white prisms of methyl O-(3,4-dimethoxybenzoyl)-deserpidate having sedative and hypotensive activity and melting at 213–216°. Its optical rotation is $[\alpha]_D^{25.5} = -140° \pm 2°$ (chloroform) and it analyzes for the empirical formula: $C_{31}H_{38}O_7N_2$. Its infrared absorption spectrum when taken in "Nujol" shows the following bands: strong bands at 2929–2837, 1714, 1467, 1287, 1272, 1230, 1180, 1141, 1099 cm.$^{-1}$; medium bands 3392, 1605, 1519, 1423, 1381, 1354, 1338, 1324, 1313, 1298, 1251, 1209, 1066, 1028, 980, 953, 925, 880, 826, 762, 741, 727, cm.$^{-1}$; weak bands at 909, 850, 808, 650, cm.$^{-1}$; shoulders at 1596, 1151, 1110, 1038, 1015, 986. It shows the following characteristic bands in the U.V. absorption spectrum, taken in ethanolic solution: maxima, $\lambda = 224$ m$\mu$ ($\epsilon = 52880$), 265 m$\mu$ ($\epsilon = 17900$), 284 m$\mu$ ($\epsilon = 13300$), 290 m$\mu$ ($\epsilon = 13360$); minima, $\lambda = 242-243$ m$\mu$ ($\epsilon = 7350$), 281 m$\mu$ ($\epsilon = 12980$) and 287 m$\mu$ ($\epsilon = 12980$).

*Example 8*

To a solution of 0.5 part by weight of methyl deserpidate in 4 parts by volume of dry, distilled pyridine is added 0.5 part by weight of 3,4,5-trimethoxybenzoyl chloride in 2 parts by volume of benzene, dropwise and with cooling and stirring. 1 part by volume of dry pyridine is used to rinse the reagent into the reaction mixture. After storing in a well-stoppered flask at 5° C. for 5 days, the mixture is poured into 50 parts by volume of water containing ice. 2 parts by volume of concentrated aqueous ammonia in 10 parts by volume of water are added with stirring. After trituration for 5 minutes, the mixture is extracted three times with methylene chloride: 50 parts by volume, 15 parts by volume, 10 parts by volume. The combined methylene chloride extracts are washed with 2 portions each of 10 parts by volume saturated sodium chloride solution, dried over anhydrous potassium carbonate, filtered and taken to dryness in vacuo. The residue, a light tan froth, is crystallized from 5 parts by volume of acetone to give white needles melting at 113°, resolidifying at 165° and remelting at 224–227°. After recrystallizing twice from methanol, methyl O-(3,4,5-trimethoxy-benzoyl)-deserpidate having sedative and hypotensive activity melts at 228–232°. It analyzes for the empirical formula: $C_{32}H_{38}O_8N_2$ and shows an optical rotation $[\alpha]_D^{23} = -134°$ (chloroform).

To a solution of 0.2 part by weight of methyl O-(3,4,5-trimethoxy-benzoyl)-deserpidate in 3 parts by volume of methanol and 0.1 part by volume of methylene chloride is added 0.2 part by volume of dilute sulfuric acid (1 part by volume sulfuric acid:4 parts by volume of water). After boiling out the methylene chloride, the solution is allowed to stand at 5° for a few hours. The salt of methyl O-(3,4,5-trimethoxy-benzoyl)-deserpidate with sulfuric acid crystallizes with water from this solution in white needles, which after filtering and washing with methanol melt at 266–269° (dec.).

0.2 part by weight of the above ester is slurried with 1 part by volume of methanol. Methanol saturated with gaseous hydrochloric acid is added until the ester is in solution. After evaporation to dryness, the hydrochloride of methyl O-(3,4,5-trimethoxy-benzoyl)-deserpidate crystallizes from 1 part by volume of 95 percent ethanol with water as needles. After filtering and washing with methanol, the product melts at 253–256° (dec.).

To a solution of 0.2 part by weight of the above-described ester in 3 parts by volume of methanol and 0.1 part by volume of methylene chloride is added 0.05 part by volume of dilute nitric acid (1 part by volume of nitric acid:4 parts by volume of water). Crystallization begins immediately. After cooling at 5°, the plates are filtered and washed with methanol. The thus obtained salt of methyl O-(3,4,5-trimethoxy-benzoyl)-deserpidate with nitric acid melts at 254–260° (dec.).

0.2 part by weight of the above-described ester is dissolved in 3 parts by volume of methanol and 0.1 part by volume of methylene chloride 0.3 part by volume of oxalic acid solution (1 part by weight of anhydrous oxalic acid:10 parts by volume of water) is added. After boiling out the methylene chloride, the solution is cooled at 5° for several hours. The white crystals formed are filtered and washed with methanol. The thus obtained salt of methyl O-(3,4,5-trimethoxy-benzoyl)-deserpidate with oxalic acid melts at 239–243° (dec.).

*Example 9*

To a suspension of 0.75 part by weight of deserpidic acid in 50 parts by volume of methanol and 50 parts by volume of ether, cooled in an ice bath, is added in portions and with frequent swirling a cold ethereal solution of diazoethane prepared from 6 parts by volume of nitrosoethylurethane. There is a slow dissolving of the deserpidic acid, so that finally all acid is dissolved while still an excess of diazoethane is present. The solution is evaporated, first at atmospheric pressure and finally in vacuo to give a light tan frothy solid. The thus obtained ethyl deserpidate shows the following infrared spectrum taken in a Nujol (mineral oil) mull; the wave lengths are given in reciprocal centimeters and grouped together according to their strength: strong bands at 3381–3280, 2965–2837, 1727–1714, 1458, 1153, 1138, 1100, 738; medium to strong bands at 1378, 1332, 1314, 1301, 1283, 1241, 1189, 1049, 1018; medium bands at 982, 945, 928; weak bands at 1632, 1587, 901, 886, 851, 691, 648; shoulders at 3048, 1500, 1273, 1224, 963, 865, 832.

Ethyl deserpidate can be converted into its salt with nitric acid in the following way:

To a solution of ethyl deserpidate in dilute acetic acid is added saturated sodium nitrate solution. After cooling at 5° for several days the crystals formed are filtered and washed with a small volume of water. The thus obtained salt of ethyl deserpidate with nitric acid melts at 268–271° (dec.). It can be recrystallized from methanol and is thus obtained in needles melting at 272–275° (dec.).

If instead of diazoethane diazomethane or another diazo-lower alkane is employed in the above reaction, methyl deserpidate or other lower alkyl deserpidates respectively are obtained.

*Example 10*

To 0.5 part by weight of ethyl deserpidate, dried by distilling toluene from it twice, in 4 parts by volume of dry, distilled pyridine, is added dropwise and with stirring 0.5 part by weight of 3,4,5-trimethoxy-benzoyl chloride in 2 parts by volume of dry benzene. 1 part by volume of dry pyridine is used as a rinse. The flask is securely stoppered and kept at 5° for 3 days and then at room temperature overnight. The reaction mixture is poured into 50 parts by volume of water and ice. 2 parts by volume of concentrated aqueous ammonia in 10 parts by volume of water are added slowly and with stirring. After stirring for 5 minutes, the mixture is extracted three times with methylene chloride: 50 parts by volume; 15 parts by volume; 10 parts by volume. The combined methylene chloride extracts are washed with 2 portions of saturated sodium chloride solution. After drying over anhydrous potassium carbonate, the solution is filtered and evaporated in vacuo to dryness. Toluene is vacuum-distilled from the residue three times.

0.51 part by weight of the above residue is dissolved in 10 parts by volume benzene and poured onto a column of 10 parts by weight of activated alumina (Woelm; activity I), using 15 parts by volume of benzene as wash. The fractions eluted with benzene, benzene containing 0.1 percent methanol and benzene containing 0.2 percent methanol, were evaporated to dryness and the residue dissolved in methanol. Dilute nitric acid (1:4) was added to the methanolic solution, whereupon the nitric acid salt of ethyl O-3,4,5-trimethoxybenzoyl-deserpidate crystallizes, M.P. 255–260° (dec.). It can be recrystallized from a mixture of methanol and methylene chloride by evaporating the methylene chloride; it then melts at 258–260° (dec.).

*Example 11*

To a solution of 0.90 part by weight of methyl deserpidate in 20 parts by volume of dry distilled pyridine is added 1.0 part by weight of nicotinoyl chloride. The reaction mixture is kept at 5° C. for 5 days and then poured into 100 parts by volume of water. 10 parts by volume of concentrated aqueous ammonia in 10 parts by volume of water are added and the mixture extracted three times with 30 parts by volume each of methylene chloride. The combined extracts are washed with 30 parts by volume of a saturated aqueous sodium chloride solution, dried over magnesium sulfate and anhydrous sodium carbonate, filtered and evaporated to dryness in vacuo at room temperature. The residue is chromatographed over 10 parts by weight of magnesium silicate (Florex) using about 150 parts by volume of methylene chloride for elution. After evaporation of the solvent and crystallization from benzene methyl O-nicotinoyl-deserpidate melting at 167–169° C. (dec.) is obtained.

*Example 12*

To a solution of 0.90 part by weight of methyl deserpidate in 20 parts by volume of dry distilled pyridine is added 1.5 parts by weight of 6-quinoline carboxylic acid chloride. The reaction mixture is kept at 5° C. for five days and then poured into 100 parts by volume of water. 10 parts by volume of concentrated aqueous ammonia in 10 parts by volume of water are added and the mixture extracted three times with 30 parts by volume each of methylene chloride. The combined extracts are washed with 30 parts by volume of a saturated aqueous sodium chloride solution, dried over magnesium sulfate and anhydrous sodium carbonate, filtered and evaporated to dryness in vacuo at room temperature. The residue is crystallized from a mixture of methanol and ether. The thus obtained dihydrate of methyl O-(6-quinolinoyl)-deserpidate melts at 172–174° C. (dec.).

*Example 13*

To a solution of 0.90 part by weight of methyl deserpidate in 20 parts by volume of dry distilled pyridine is added 1.2 parts by weight of β-naphthoyl chloride. The reaction mixture is kept at 5° C. for five days and then poured into 100 parts by volume of water. 10 parts by volume of concentrated aqueous ammonia in 10 parts by volume of water are added and the mixture extracted three times with 30 parts by volume each of methylene chloride. The combined extracts are washed with 30 parts by volume of a saturated aqueous sodium chloride solution, dried over magnesium sulfate and anhydrous sodium carbonate, filtered and evaporated to dryness in vacuo at room temperature. The residue is chromatographed over 10 parts by weight of magnesium silicate (Florex) using about 150 parts by volume of methylene chloride for elution. After evaporation of the solvent and crystallization from benzene methyl O-(β-naphthoyl)-deserpidate melting at 191–192° C. is obtained.

*Example 14*

To a solution of 0.90 part by weight of methyl deserpidate in 20 parts by volume of dry distilled pyridine is added 1.0 part by weight of 3,4-methylenedioxybenzoyl chloride. The reaction mixture is kept at 5° C. for five days and then poured into 100 parts by volume of water. 10 parts by volume of concentrated aqueous ammonia in 10 parts by volume of water are added and the mixture extracted four times with 30 parts by volume each of methylene chloride. The extracts are combined, dried over magnesium sulfate and anhydrous sodium carbonate, filtered and evaporated to dryness. The residue is chromatographed over 10 parts by weight of magnesium silicate (Florex) using methylene chloride containing 5 percent methanol as eluant. After evaporation of the solvent and crystallization from a mixture of methylene chloride, methanol and ligroin methyl O-(3,4-methylenedioxybenzoyl)-deserpidate melting at 195–196° C. is obtained.

*Example 15*

0.3 part by weight of deserpidic acid is dissolved in 20 parts by volume of a 1:1 mixture of methylene chloride and dioxane. A solution of diazo-n-butane in ether is added dropwise with cooling in an ice bath until nitrogen is no longer evolved and a slight orange color persists. The mixture is left standing for 24 hours at room temperature and then freed from solvents under reduced pressure. The residue is dissolved in methylene chloride and passed over a short column of 5 parts by weight of magnesium silicate (Florex). Methylene chloride containing 10 percent methanol is used as eluant. After evaporation of the solvent n-butyl deserpidate remains.

This residue is dissolved in 10 parts by volume of dry pyridine and 5 parts by volume of acetic anhydride added. After standing for four days at 5° C., the reaction is poured into water, 10 parts by volume of concentrated aqueous ammonia added and the mixture extracted four times with methylene chloride. The extracts are washed with a saturated aqueous sodium chloride solution and dried over magnesium sulfate and sodium carbonate. After evaporation there is obtained a crude residue which is purified by passing over 5 parts by weight of magnesium silicate (Florex) using methylene chloride as a solvent. The fraction eluted with methylene chloride containing 10 percent methanol yields crystalline n-butyl O-acyl-deserpidate, M.P. 226–228° C.

It will be appreciataed that other esters of alkyl deserpidates with other acids may be obtained using the appropriate acids, their chlorides or anhydrides. Such acids, for example, are: 4-methoxy-benzoic, isonicotinic, cinnamic, phenylacetic, mandelic, tropic, p-methoxy-cinnamic, 3,4-dimethoxy cinnamic, 3,4,5-triethoxybenzoic, O-carbethoxy-syringaic, thienoic or picolinic acid.

What is claimed is:

1. A compound selected from the group consisting of deserpidic acid alkali metal salts and acid addition salts thereof.
2. A compound selected from the group consisting of lower alkyl esters of deserpidic acid and acid addition salts thereof.
3. Deserpidic acid.
4. Methyl deserpidate.
5. Ethyl deserpidate.
6. The nitric acid salt of ethyl deserpidate.

References Cited in the file of this patent

Annals of N.Y. Acad. of Sci., vol. 59, pp. 1–7 (1954) (Schlittler et al.).

Jour. Amer. Chem. Soc., vol. 77, pp. 1071–1072, February 1955 (MacPhillamy et al.).

UNITED STATES PATENT OFFICE
CERTIFICATE OF CORRECTION

Patent No. 2,982,770                      May 2, 1961

Paul Reuben Ulshafer

It is hereby certified that error appears in the above numbered patent requiring correction and that the said Letters Patent should read as corrected below.

Column 3, line 31, before "a" insert -- as --; column 5, lines 17 and 18, strike out "of acetic acid of 15 percent strength with adequate mixing, the solution is".

Signed and sealed this 26th day of December 1961.

(SEAL)
Attest:

ERNEST W. SWIDER                      DAVID L. LADD
Attesting Officer                      Commissioner of Patents
                                                                USCOMM-DC